United States Patent [19]

Staudinger

[11] Patent Number: 5,012,733
[45] Date of Patent: May 7, 1991

[54] METHOD FOR BINDING OF ROUND BALES OF HARVESTED AGRICULTURAL CROPS

[75] Inventor: Ingo Staudinger, Clausthal-Zellerfeld, Fed. Rep. of Germany

[73] Assignee: Gebrüder Welger GmbH & Co. Kommanditgesellschaft, Wolfenbüttel, Fed. Rep. of Germany

[21] Appl. No.: 375,818

[22] Filed: Jul. 5, 1989

[30] Foreign Application Priority Data

Jul. 4, 1988 [DE] Fed. Rep. of Germany ....... 3822553

[51] Int. Cl.⁵ .................. B65B 13/02; B65B 13/10
[52] U.S. Cl. ............................. 100/2; 100/5; 100/13
[58] Field of Search ............... 100/2, 3, 5, 13, 15

[56] References Cited

U.S. PATENT DOCUMENTS

| | | | |
|---|---|---|---|
| 4,248,143 | 2/1981 | Gaeddert | 100/13 X |
| 4,557,189 | 12/1985 | Schaible | 100/13 X |
| 4,649,812 | 3/1987 | Mouret | 100/13 X |
| 4,793,249 | 12/1988 | Wellman | 100/13 |
| 4,796,524 | 1/1989 | Renaud | 100/13 X |
| 4,800,811 | 1/1989 | Wellman | 100/13 X |

FOREIGN PATENT DOCUMENTS

| | | | |
|---|---|---|---|
| 0159953 | 10/1985 | European Pat. Off. | 100/3 |
| 2620807 | 11/1977 | Fed. Rep. of Germany | 100/5 |
| 3445060 | 6/1986 | Fed. Rep. of Germany | 100/13 |

*Primary Examiner*—Harvey C. Hornsby
*Assistant Examiner*—Stephen F. Gerrity
*Attorney, Agent, or Firm*—Toren, McGeady & Associates

[57] ABSTRACT

A method and apparatus for helically-shaped binding of round bales consisting of harvested agricultural crops using two cord strands, which respectively wrap around somewhat more than half of the bale for shortening the binding period, one cord strand being cut off to begin with and the other cord strand being wrapped several times around the previously cut-off strand prior to being cut-off itself. In order to avoid a mutual loosening of the severed cord ends after severing the cord strands upon termination of the binding process.

8 Claims, 3 Drawing Sheets

METHOD FOR BINDING OF ROUND BALES OF HARVESTED AGRICULTURAL CROPS

BACKGROUND OF THE INVENTION

The invention is directed to a method for helically-shaped binding of round bales of harvested agricultural crops in a round bale press with a first twine cord and with a second twine cord, which are conducted back and forth during the binding process by means of two cord guide members along a slot extending across the width of the press space and which cross over each other prior to being cut off at the termination of the binding process.

The wrapping of round bales must simultaneously fulfill two essential requirements. On the one hand, the round bale must be tightly wrapped a sufficient number of times in order to obtain a cylindrical shape and a high bale strength. On the other hand the wrapping period must simultaneously be shortened and unnecessary wrapping must be avoided whenever possible.

A method is known from DE-OS 34 14 080, in which two twine ropes are used in order to shorten the binding period, which ropes respectively wrap around only a little bit more than half the bale. The binding of the bale begins herein on both sides at a distance from the vertical central plane of the bale, and the twine ropes are introduced with their free ends into the press space and are carried along the bale. During rotation of the bale the two twine cords are initially respectively guided in opposite directions across the center of the bale and outward towards the ends of the bale, where they form several parallel windings. The cords are then conducted inwardly from the outward side towards the center of the bale, where the two twine cords cross and are at the same time cut off respectively by a cutter. This method has the principal disadvantage, that the ends of both twine cords lie completely loose upon the surface of the bale at the end of the binding process. If the bale is rolled on the ground or due to the effect of wind, the two loose ends unravel from the surface of the bale, causing the bindings to loosen in the central bale region whereupon the bale expands in this region so that out of round (conical) bales are formed. The central region of the bale is especially subjected to a high expansion pressure, since the swath which has to be picked up from the ground is more tightly packed in the middle than at the edges.

In another process with two twine cords known from EP-A-0 217 714, the binding starts off center on both sides of the bale. Then the two twine ropes are led a short distance upstream of the respective bale ends, wrapped simultaneously several times around both bale ends at respectively one point and subsequently led back up to a short distance before the center of the bale, where both twine cords form several parallel windings spaced next to each other in order to be then simultaneously cut off. A mutual crossing over of the two twine cords does not occur, so that no interconnection between the bindings of both bale halves exist. At the end of the binding process, two free cord ends lie upon the surface of the bale, which ends can unravel independently of each other. Another disadvantage lies in the higher consumption of twine cord because of the double parallel windings on both sides of the bale middle.

SUMMARY OF THE INVENTION

Accordingly, it is an object of the present invention to improve a method of the above-mentioned type so that a simultaneous loosening of the lastly laid windings of both twine strands is prevented.

Pursuant to this object, and others which will become apparent hereafter, one aspect of the present invention resides in cutting off both twine cords consecutively and having the second cut twine cord cross several times over the previously cut off cord.

Because of the multiple winding of the firstly severed twine cord, its cord end is clamped or jammed upon the surface of the bale. Both cord ends thus cannot loosen simultaneously. Thus a secure mutual interconnection of the wrappings of both bale halves is produced, which does not loosen and yields a cylindrical bale form with all crop types and pressing densities.

In an advantageous embodiment of the inventive method in the wrapping process starts on both sides of the round bale with free cord ends spaced from the bale edge. The cord strands are then conducted outwardly towards the respective bale end and subsequently inwardly back respectively across the bale center and over same, so that a crossover point of both cord strands lies approximately in the center of the bale. Herein each cord strand crosses over its own initial winding and presses it against the surface of the bale, so that they are retained by friction and one achieves a tight helically-shaped wrapping of both bale halves. In this manner a loosening of the cord windings laid initially as well as also at the end of the binding process is safely prevented. The finished wrapped round bale has only one free cord end at the surface of the bale, while the other three cord ends are securely and tightly held by the superimposed cord windings.

An apparatus for performing the inventive method includes means permitting cutting off of one twine cord at a later time.

This is accomplished by the feed motion of the cord guiding members being temporarily stopped by means of a clutch upstream of a cutoff device after the severance of the first twine cord. On the one hand this enables a simple design of the cut-off device without any type of control, and on the other hand the quantity and the location of the overrun or cover winding can be selected without any difficulties.

In a favorable embodiment of the invention, the cord guide members are moved back and forth on two straight line guides arranged one behind the other by means of respectively a chain drive, a screw spindle or the like, wherein the rope eyelets directly guiding the twine cord are arranged to be spaced one above the other. This allows a design-wise simple drive of the cord guide members without having to reverse the motion. A drive in only one direction is for instance necessary if the twine cord itself serves as a drive and an expensive reversing gear is to be avoided.

It is advantageous if both guides overlap only in the region of the center of the press space and both chain drives have a common axis of rotation located approximately in the middle of the press space and if a pulling bolt is assigned to each cord guide member, which members are arranged to be symmetric to the axis of rotation of the respective chain drive. This arrangement permits a layout of only one stationary cutoff device for both twine cords without any problems.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
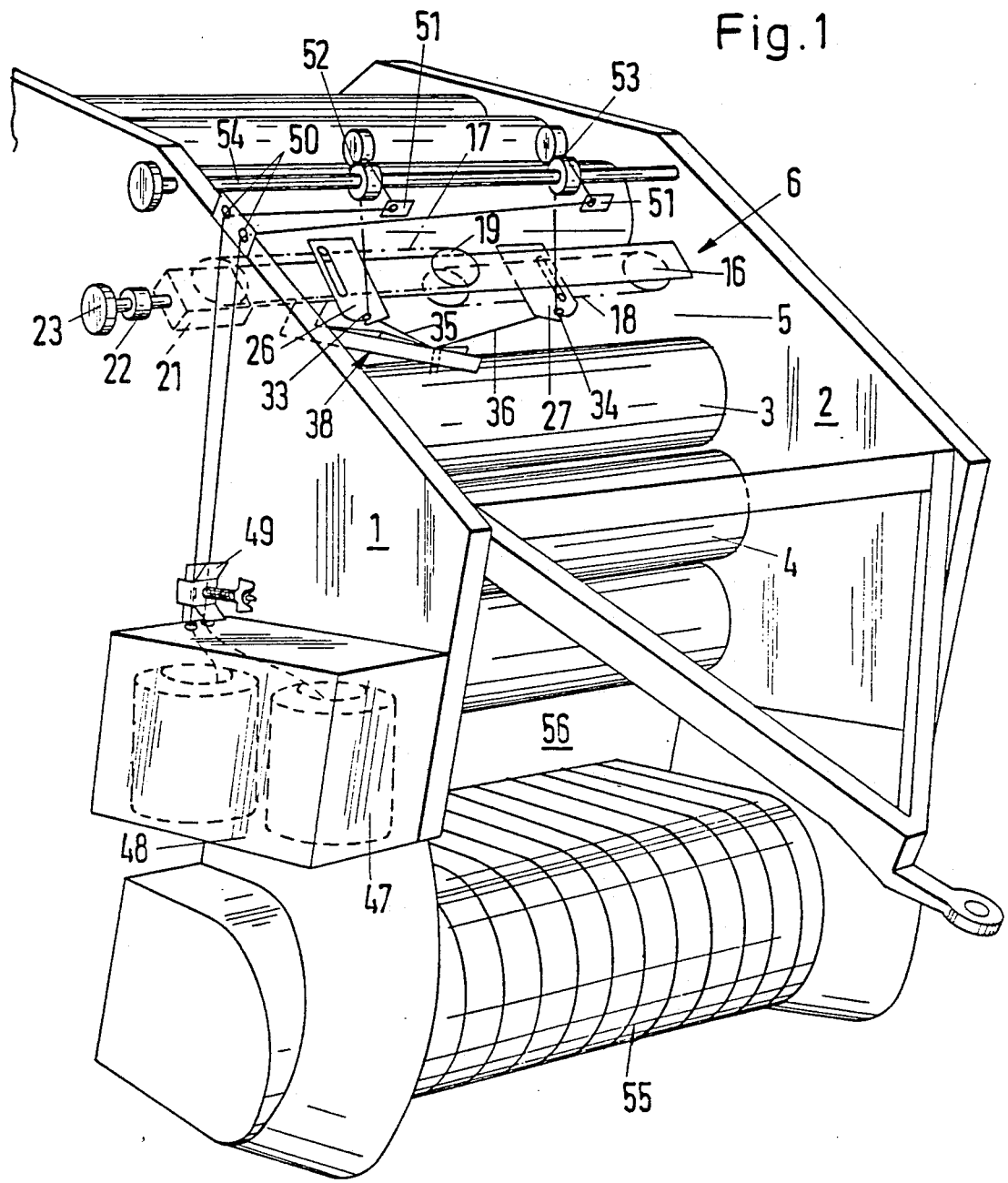
FIG. 1 is a perspective view of the front portion of a round bale press with a binding device according to the invention.

As seen in FIG. 1, conveyor or transportation rollers 3, 4 are attached in the front upper region of a round bale press between the left side wall 1 and the right side wall 2, so as to form a pressing space gap 5. A binding device 6 is arranged closely above this gap 5 and consists of a lefthand U-shaped transverse beam 7 and a righthand U-shaped transverse beam 8, whose webs 9, 10 lie next to each other and overlap in the center of the pressing space. The transverse beams 7 and 8 are arranged to be parallel to the conveyor rollers 3, 4, and their web faces 9, 10 point obliquely upwards towards the rear, so that legs 11, 12 of the left transverse beam 7 face forward, while legs 13, 14 of the righthand transverse beam 8 face toward the rear. Both transverse beams 7, 8 are connected in the center with each other and at the outer ends with the side walls 1, 2.

Figure 3:
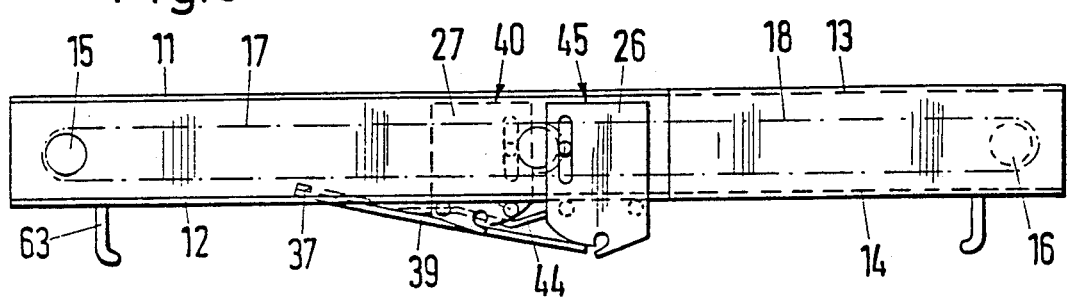
FIG. 3 is a view in accordance with FIG. 2, wherein the cord guidance members are depicted in their cross-over dead center positions.
Figure 4:
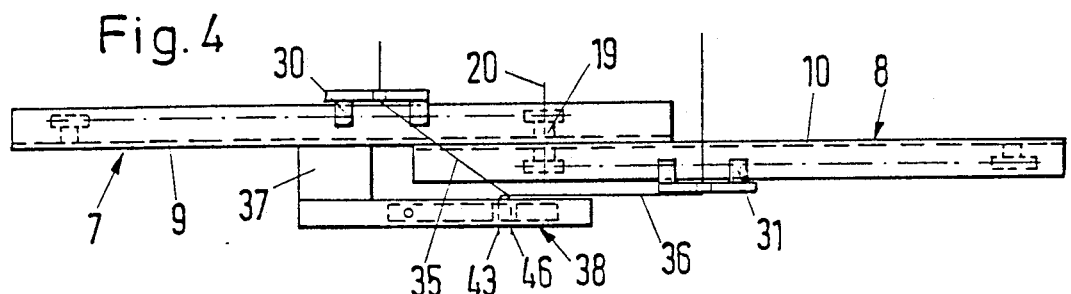
FIG. 4 is a bottom view of a binding device in FIG. 1.

One sprocket wheel 15, 16 is supported respectively at the web 9, 10 and between the legs 11, 12 or 13, 14 in the vicinity of each side wall 1, 2. These sprocket wheels 15, 16 act by means of one roller chain 17, 18 respectively together with a twin sprocket wheel 19 whose axis of rotation 20 is located in the middle of the pressing space. The roller chain 17, 18 is driven by a gear train 21 flanged at the rear side of the transverse beam 7, which gear train 21 on the one hand is in connection with the sprocket wheel 15 and on the other hand can be connected with a shaft, not depicted here, revolving during the operation of the press, the connection being through a clutch 22 and a drive disk 23. Each roller chain 17, 18 is equipped with a pulling pin 24, 25 on its side facing away from the respective web 9, 10. The pulling pins 24, 25 have a point symmetric arrangement to the axis of rotation 20, so that they are moved in the same direction counter to each other when the roller chains 17, 18 are driven. Respectively, one cord guiding member 26, 27 with a sliding guide 28, 29, provided as an elongated hole, is arranged closely upstream of the legs 11, 12 or downstream of the legs 13, 14. The respective pulling pins 24, 25 engage permanently into the sliding guides. The cord guidance members 26, 27 are essentially shaped as rectangular plates and extend respectively inward across the edge of the legs 12, 14 and beyond them. Each cord guidance member 26, 27 comprises two guidance rollers 30, 31 arranged next to each other and spaced from each other, which displaceably guide the cord guidance members 26, 27 respectively on the lower legs 12, 14 of the transverse beam 7, 8. The lower left edge of the cord guidance member 26 and the lower right edge of the cord guidance member 27 are respectively designed as a rounded off edge 32, which each discharge into an open cord guidance eyelet 33, 34 for respectively one cord strand 35, 36. The cord guidance eyelet 33 of the cord guidance member 26 lies at a spacing below the cord guidance member 27, which is chosen in such a way, that the incoming cord strands 35 and 36 can be led past each other in two planes, wherein the inlet planes of the cord strands 35, 36 stand in the pressing space approximately at right angles to the plane of revolution of the roller chains 17, 18. Furthermore, the assignment of the elongated hole 28, 29 and the cord guide eyelet 33, 34 of the cord guidance members 26, 27 is chosen so that the cord guide eyelets 33, 34 mutually cross in the center of the pressing space and thus the path of motion of the cord guidance eyelets 33, 34 overlap in a region discernible from FIG. 3.

A console 37 is fastened at approximately half the length of the transverse beam 7 at the bottom on the back side of its web 9—meaning on the side facing the pressing space gap 5, which brackets extend rearward and support a cutting-clamping device 38 arranged behind the cord guide member 27. The cutting-clamping device 38 consists of a piece of flat iron 39 which extends obliquely downwards from the bracket 37 up to under the cord guide eyelet 34 of the cord guidance member 27 in its dead center position 40, discernible from FIG. 3. The piece of flat iron 39 has on its upper side an erect fixed cutter 41 with a cutter edge 42 which is oriented towards the inlet path of the cord strand 36 of the cord guidance member 27 and which severs the cord shortly before reaching the inner dead center position 40 of its cord guidance member 27 while simultaneously retaining the cord end 43 by means of a clamping plate 44 permanently pressing from above in the cutter region against the flat iron piece 39. The clamping plate can be, for instance, in the shape of a spring steel strip, and is fastened at the flat iron piece 39 in the vicinity of the bracket 37, and its free end is bent off upwards in order to securely receive the cord strands 35, 36. The flat iron piece 39 is lengthened up to below the cord guidance eyelet 33 of the other cord guidance member 27 in its dead center position 45 discernible from FIG. 3, so that it forms a run-up acceptance incline for the cord strand 35 conducted from the left side wall 1 up to and beyond the pressing space center and so that the cutter 41 severs the cord only after the motion reversal of the cord guide member 26, meaning arriving from the same direction as the previously severed cord strand 36 and so that the cord end 46 is also held fast by means of the clamping plate 44.

Each cord strand 35, 36 unwinds from separate storage rollers 47, which are supported in a storage container 48 fastened at the left side wall 1. Emanating from there each cord strand 35, 36 initially traverses a cord brake 49, passing then through respectively two stationary guidance eyelets 50, 51 and respectively through one pair of rollers 52, 53 from which one cord strand 35 is directed through the cord guidance eyelet 33 and the other cord strand 36 through the cord guidance eyelet 34 towards the cutter-clamping device 38. A drive shaft 54 passes respectively through the lower roller of the pair of rollers 52, 53 and drives the pair of rollers temporarily for projecting the cord strands 35, 36 into the pressing space gap 5, while they freewheel because of the entrainment of the cord strands 35, 36 by the rotating bale.

Figure 2:
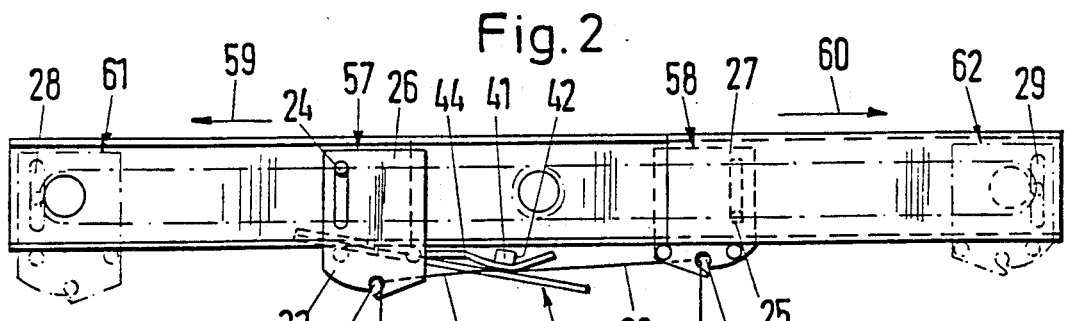
FIG. 2 is a front view of the binding device wherein the cord guidance members are depicted in their original position.

A collecting arrangement 55 is located on the front lower side of the round bale press, which collects the crop lying in swaths on the ground and conveys it through a draw-in slot 56 extending across the width of the pressing space housing into the pressing space. After the tractor operator has stopped or interrupted the commodity feed, he allows the bale to roll further in the machine and switches the drive of the shaft 54 on for a short time, so that both cord strands 35, 36 fall into the pressing space gap 5 where they are carried along by the rotating bale and where the cord ends 43, 46 are torn out of the cutter clamping device 38. Then the cord guidance members 26, 27 are powered by engaging the clutch 22 and initially move from their original positions 57, 58 (FIG. 2) outward into the directions designated by the arrows 59, 60 until they reach their outer dead center positions 61, 62 depicted by broken dotted lines in FIG. 1. The cord guidance members 26, 27 can be temporarily stopped there by disengagement of the clutch 22 in order to form several parallel windings at the sides of the bale. If a greater edge spacing is desired, the cord strands 35, 36 can be already previously limited in their end positions by stationary stops 63. After traversing their outer dead center position 61, 62 both cord guidance members 26, 27 reverse their motion and travel towards the bale center in directions opposite to the arrows. All sprocket wheels 15, 16, 19 rotate during the entire binding process only in a counterclockwise direction. Both cord guidance eyelets 33, 34, and with them the cord strands 35, 36, cross each other in the pressing space until, to begin with, the cord strand 36 runs up against the cutter 41, is severed and retained by means of the clamping plate 44. Meanwhile, the cord strand 35 is conducted past the run-up incline at the cutter 41 without being cut, the cord guidance member 26 is temporarily stopped in its dead center position 45 by disengaging the clutch 22 for instance depending upon the position of one of the cord guidance members 26, 27 in order to lay several parallel windings across the cord windings of the firstly severed cord strand 36. After reversal of the motion the cord guidance member 26 runs back in the direction of the arrow 59 in order to conduct the cord strand 55 in front of the cutter 41, which severs the strand and retains it by means of the clamping plate 44. The binding process is then terminated. Two new cord ends are clamped in position for the next binding process and both cord guidance members 26, 27 are in their initial position 57, 58 depicted in FIG. 2 in full lines.

Figure 5:
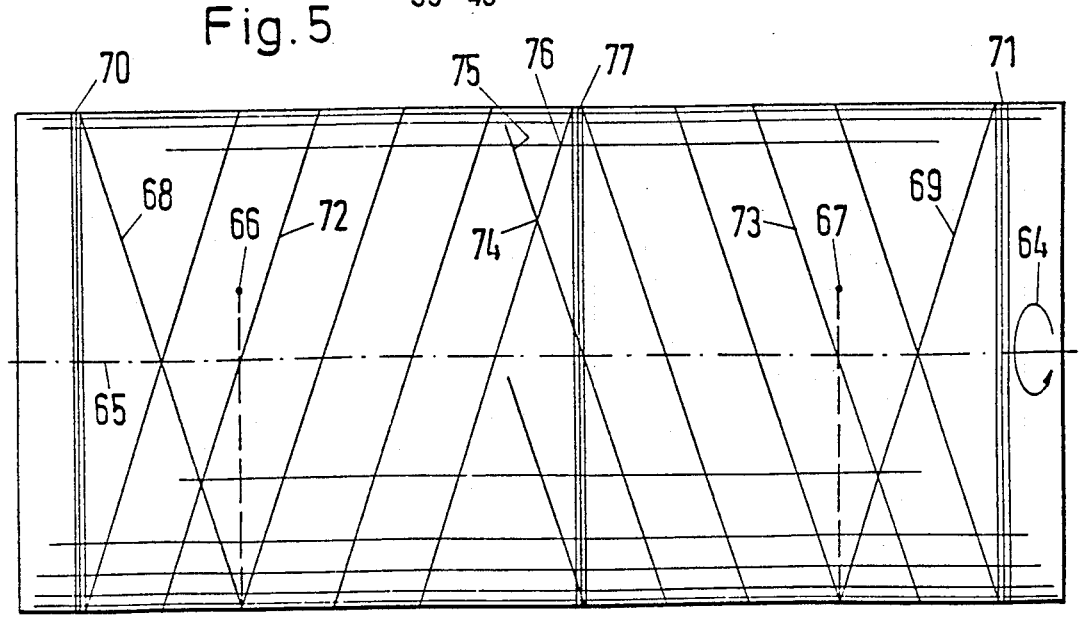
FIG. 5 is a view of a round bale bound in accordance with the method in the invention.

In the case of a round bale depicted in FIG. 5, which rotated around its axis 65 in direction of the arrow 64 during the binding process, the wrapping diagram is evident. The binding commences on both sides of the bale where the free cord ends 66, 67 are carried along by the bale. Then there follows one helically-shaped cord winding 68, 69 respectively which runs up to close before the bale end, where several parallel windings 70, 71 are laid one over the other. Helically-shaped windings 72, 73 are now laid up to the bale center between the parallel windings 70, 71 from the sides inward, where both cord strands 75, 76 form a crossover point 74 with each other, and the cord strand 75 is cut off downstream of the crossover point 74, while the other cord strand 76 winds additionally several parallel windings 77 over the cord strand 75 and is then cut off. The parallel windings 77 thus clamp the cord strand 75 tightly.

Figure 6:
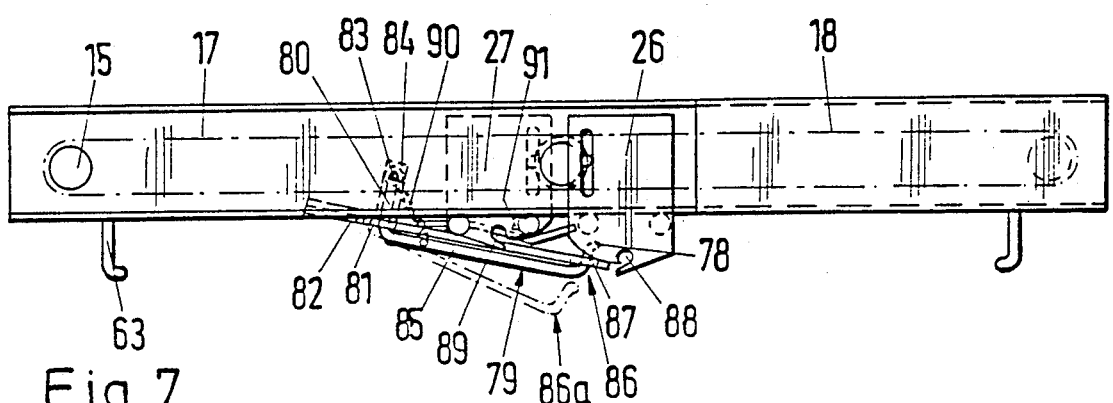
FIG. 6 is a view according to FIG. 3 with a cord beating lever.

In the embodiment depicted in FIG. 6 the cord strand which is to be cut off later is temporarily retained by a capturing lug 78 of a cord stop lever 79. The cord stop lever 79 has an L-shaped form with a short leg 80 that penetrates with its free end a recess 81 in a flat iron piece 82 and is fastened pivotally upon a peg 83, which extends parallel to the axis of rotation 20 and is supported by a web plate 84 fastened at the flat iron piece 82. The long leg 85 comprises the capturing lug 78 protruding upwards at its end. The capturing lug 78 penetrates in the working position 86 depicted in full lines in FIG. 6 where the long leg 85 rests at the flat iron piece 82, a recess 87 in the flat iron piece 82 from below and extends upwards so far that only the cord strand of the lower cord guidance eyelet 88 is stopped, while the cord strand of the other cord guidance eyelet has a free passage. A tension spring 90 energized between the peg 83 and the leg 80 holds the lever 79 in this position 86 in which the cord strand lays parallel windings over the cord end of the firstly severed cord strand. For release of the temporarily retained cord strand, the cord stop lever 29 is pivoted by a lift out mechanism not depicted here into the position 86a depicted in broken lines, in which the cord strand runs into the cutting-clamping device 91 along the upper side of the flat iron piece 82.

Figure 7:
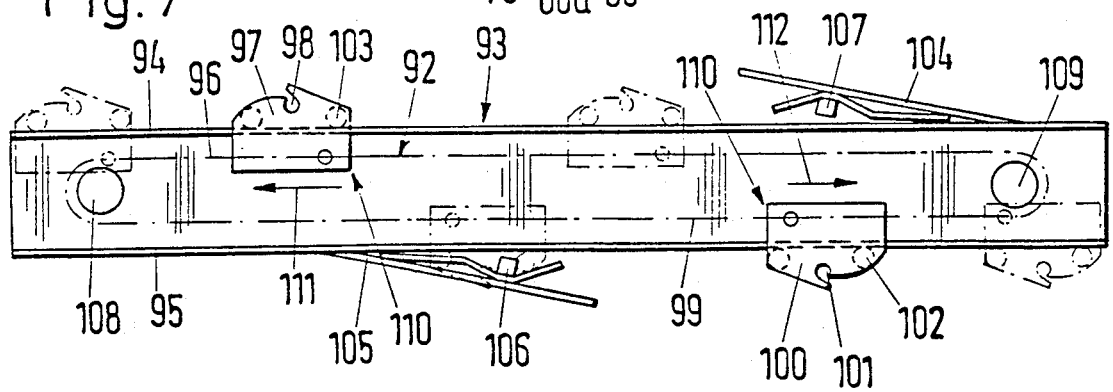
FIG. 7 is a front view of another embodiment of a binding device.

Another embodiment is shown in FIG. 7, wherein a chain drive 92 sweeping across the entire pressing space width is arranged at a U-shaped lateral beam 93 which extends between the side walls 1, 2. A cord guidance member 97 is fastened at the upper chain section 96 cord arranged closely in front of the legs 94, 95, whose cord guidance eyelet 98 projects upwards across the leg 94, while a cord guidance member 100 is fastened in the same way at the lower chain section 99, whose cord guidance eyelet 101 projects downwards across the leg 95. The cord guidance members 97, 100 are displaceably supported by means of guide rollers 102, 103 upon the legs 94, 95 and are arranged in such a way at the chain drive 92, that both cord guidance members 97, 100 pass the pressing space center simultaneously but in opposite directions. One cutting-clamping device 104, 105 is assigned to each cord guidance members 97, 100 which cutting-clamping devices operate according to the same principle as has been described previously in the first embodiment. The cutting-clamping device 105 for the cord guidance member 100 is fastened at the lower side of the legs 95, and its effective cutting edge 106 is spaced from the opposite side wall 2 with a spacing greater than half of the pressing space width. The cutting-clamping device 104 for the cord guidance member 91 is fastened at the upper side of the leg 94. Its effective cutting edge 107 is spaced from the opposite side wall 1 with a spacing corresponding to approximately three-quarters of the pressing space width. The cord guidance members 97, 100 are driven for instance by an electro-motor capable of rotating in both directions, which is in connection with one of the sprocket wheels 108, 109.

The cord guidance members 97, 100 are in their original position 110 depicted in full lines at the start of the binding process. They are then, to begin with, moved outward in direction of the arrows 111, 112 up to the side wall, where they are temporarily stopped and moved in the opposite direction towards the bale center after reversal of the direction of rotation of the motor. The two cord guidance eyelets 98, 101 cross over in the center of the bale and the cord guidance member 100 then moves its cord strand against the cutting edge 106, while the cord guidance member 97 conducts its cord strand still several times in a helical shape over the binding of the firstly severed cord strand located beneath, prior to the cord guidance member 97 reaching the cutting-clamping device 104 where the cord strand is severed and its cord end is clamped. Instead of the parallel windings in the center a bale bound in such a manner comprises several crossover points of both cord strands spaced next to each other on one side.

While the invention has been illustrated and described as embodied in a method and apparatus for binding round bales of harvested agricultural crops, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A method for helically binding round bales of harvested agricultural crops, comprising the steps of:
   providing a first cord strand and a second cord strand;
   conducting the cord strands back and forth over a bale so that both strands cross over at one point;
   cutting the cord strands consecutively after the strands cross; and
   crossing the cut end of the first cut strand several times with the subsequently second cut strand.

2. A method according to claim 1, wherein said crossing step includes wrapping the first cut strand with several parallel windings centrally on the bale.

3. A method according to claim 1, wherein said crossing step includes wrapping the first cut strand with helically-shaped windings.

4. A method according to claim 1, wherein said providing step includes simultaneously providing a cord strand end on each side of the bale at a distance from the bale edge, said conducting step including sequentially conducting the cord strands outward to a respective bale end and sequentially back inward respectively across the center of the bale so that the cross-over point of both strands lies approximately at the center of the bale.

5. A method according to claim 1, wherein said cutting step includes providing cut-off means for consecutively severing the cord strands after they cross.

6. A method according to claim 5, wherein said conducting step includes conducting the cord strands with cord guidance members executing a feed motion, and further comprising the step of temporarily stopping the feed motion of the cord guidance members conducting the cord strands, with a clutch, after cutting the first cord strand in said cutting step.

7. A method according to claim 5, and further comprising the step of temporarily holding a cord strand in front of the cut-off means, by a cord stop lever.

8. A method according to claim 5, wherein the step of providing cut-off means includes providing separate severence device for each cord strand.

* * * * *